(12) United States Patent
Luo et al.

(10) Patent No.: US 9,141,473 B2
(45) Date of Patent: Sep. 22, 2015

(54) PARALLEL MEMORY ERROR DETECTION AND CORRECTION

(75) Inventors: Xiao Luo, Cupertino, CA (US); Adrian E. Ong, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 349 days.

(21) Appl. No.: 13/427,465

(22) Filed: Mar. 22, 2012

(65) Prior Publication Data

US 2012/0246507 A1 Sep. 27, 2012

Related U.S. Application Data

(60) Provisional application No. 61/467,640, filed on Mar. 25, 2011.

(51) Int. Cl.
*H03M 13/00* (2006.01)
*G06F 11/10* (2006.01)

(52) U.S. Cl.
CPC .................................. *G06F 11/1048* (2013.01)

(58) Field of Classification Search
CPC ..... G06F 11/14; G06F 11/10; G06F 11/1068; G06F 12/0246; G06F 11/1048; G06F 11/07; G06F 11/0715; G06F 11/08; G06F 11/085; G06F 11/11; G11C 16/0483; G11C 7/12
USPC .................. 714/753, 2, 54, E11.023, E11.024
See application file for complete search history.

(56) References Cited

U.S. PATENT DOCUMENTS

| | | | | |
|---|---|---|---|---|
| 5,164,944 A | * | 11/1992 | Benton et al. | 714/765 |
| 5,610,929 A | * | 3/1997 | Yamamoto | 714/785 |
| 6,597,595 B1 | * | 7/2003 | Ichiriu et al. | 365/49.18 |
| 8,341,498 B2 | * | 12/2012 | D'Abreu et al. | 714/766 |
| 2006/0209813 A1 | * | 9/2006 | Higuchi et al. | 370/366 |
| 2008/0148126 A1 | * | 6/2008 | Eilert et al. | 714/755 |
| 2009/0086849 A1 | * | 4/2009 | Tsai et al. | 375/298 |
| 2010/0188883 A1 | * | 7/2010 | Chen et al. | 365/148 |
| 2011/0047442 A1 | * | 2/2011 | Dave et al. | 714/773 |
| 2011/0051804 A1 | * | 3/2011 | Chou et al. | 375/240.03 |
| 2011/0267933 A1 | * | 11/2011 | Ross et al. | 369/47.15 |

* cited by examiner

*Primary Examiner* — Albert Decady
*Assistant Examiner* — Enamul M Kabir
(74) *Attorney, Agent, or Firm* — Renaissance IP Law Group LLP

(57) ABSTRACT

A system implementing parallel memory error detection and correction divides data having a word length of K bits into multiple N-bit portions. The system has a separate error processing subsystem for each of the N-bit portions, and utilizes each error processing subsystem to process the associated N-bit portion of the K-bit input data. During memory write operations, each error processing subsystem generates parity information for the N-bit data, and writes the N-bit data and parity information into a separate memory array that corresponds to the error processing subsystem. During memory read operations, each error processing subsystem reads N-bits of data and the associated parity information. If, based on the parity information, an error is detected from the N-bit data, the error processing subsystem attempts to correct the error. The corrected N-bit data from each of the error processing subsystems are combined to reproduce the K-bit word.

14 Claims, 2 Drawing Sheets

PARALLEL MEMORY ERROR DETECTION AND CORRECTION

CROSS REFERENCE TO RELATED APPLICATION

This application claims the benefit under 35 U.S.C. §119 (e) of U.S. Patent Application No. 61/467,640, filed Mar. 25, 2011, which is incorporated by reference herein in its entirety.

GOVERNMENT RIGHTS

This invention was made with U.S. Government support under Grant/Contract No. HR0011-09-C-0023 awarded by DARPA. The U.S. Government retains certain rights in this invention.

TECHNICAL FIELD

This disclosure relates generally to memory management.

BACKGROUND

A memory device can be an integrated circuit (also known as a chip or a microchip) that includes numerous memory cells. When the size of a cell reaches nanometer scale, errors become essentially unavoidable. The errors can include permanent errors or soft errors. The permanent errors can be caused by defects. The defects can be quickly and consistently screened during testing. The defects can be replaced by good memory elements using standard memory redundancy technology.

The errors in memory systems can include soft errors caused by ionizing radiation, voltage glitches, pattern sensitive bits, or read/write error probability of memory bits. The errors can be caused by unreliable data paths between the memory bits and the read sensing circuits or write driver circuits. In the case of dynamic random access memory (DRAM) and statistic random access memory (SRAM) technologies, soft errors caused by ionizing particles can cause single bit error events, which oftentimes cannot be screened by normal testing. In the case of magnetic random access memory (MRAM) technology, including spin-transfer torque random access memory (STT-RAM) technology, the write and read error rates of each memory bit may be high enough where one in 1.0e9 events may be erroneous.

SUMMARY

Techniques of parallel memory error detection and correction are described. A memory device (e.g., an STT-RAM device) implementing the parallel memory error detection and correction divides a word of input data having a word length of K bits into multiple portions, each portion having N bits. The memory device has a separate error processing subsystem for each of the N-bit portions, and utilizes each error processing subsystem to process the associated N-bit portion of the K-bit input data. During memory write operations, each error processing subsystem generates parity information for the N-bit data, and writes the N-bit data and parity information into a separate memory array that corresponds to the error processing subsystem. During memory read operations, each error processing subsystem reads N-bits of data and the associated parity information. If, based on the parity information, an error is detected from the N-bit data, the error processing subsystem attempts to correct the error. The corrected N-bit data from each of the error processing subsystems are combined to reproduce the K-bit word.

In general, one aspect of the subject matter described in this specification can be embodied in an apparatus that includes: a first N-bit error processing subsystem coupled to a first memory array, the first error processing subsystem configured to perform first error processing on a first portion of a K-bit word carried on a K-bit data bus, the first portion of the K-bit word stored in the first memory array; a second N-bit error processing subsystem coupled to a second memory array, the second N-bit error processing subsystem configured to perform, in parallel to the first error processing of the first N-bit error processing subsystem, second error processing on a second portion of the K-bit word, the second portion of the K-bit word stored in the second memory array; and an error circuit being connected to the a first N-bit error processing subsystem and the second N-bit error processing subsystem, the error circuit configured to produce an error signal when either the first N-bit error processing subsystem or the second N-bit error processing subsystem detects an error, the error signal indicating that a memory error has occurred to the K-bit word These and other embodiments can optionally include one or more of the following features. Each of the first N-bit error processing subsystem and second N-bit error processing subsystem can include an error detection circuit and an error correction circuit. Each of the first error processing and second error processing can include at least one of error detection or error correction. The second N-bit error processing subsystem can be configured to perform the second error processing independently from the first error processing performed by the first N-bit error processing subsystem. The first memory array and the second memory array can be portions of a spin-transfer torque random access memory (STT-RAM) device. At least one of the first or second N-bit error processing subsystem can be configured to detect a correctable error and an uncorrectable error.

The N-bit error processing subsystem can be configured to, upon detecting the correctable error, correct the correctable error, including writing corrected data to a memory array corresponding to the N-bit error processing subsystem. The N-bit error processing subsystem can be configured to, upon detecting the uncorrectable error, send an error flag to the error circuit. The error circuit can be configured to produce the error signal upon receiving an error flag from the first N-bit error processing subsystem or the second N-bit error processing subsystem or both. At least one of the first or second N-bit error processing subsystem can be configured to add M bits of parity information to N bits of the K-bit word using a specified error correction scheme and store resulting N+M bits of data in a corresponding memory array during a memory write operation.

The N-bit error processing subsystem can include an encoder circuit connected to a K-bit data bus, the encoder circuit being configured to receive N bits of the K-bit word and generate the M bits of parity information for the N bits of the K-bit word. The N-bit error processing subsystem can include an error detection circuit connected to the corresponding memory array, the error detection circuit configured to detect an error in the N bits of the K-bit word based at least in part on the M bits of parity information and the error correction scheme and generate one or more syndrome bits indicating the detected error. The N-bit error processing subsystem can include an error correction circuit connected to the error detection circuit, the error correction circuit configured to correct the detected error using the one or more syndrome bits. The encoder circuit and the error correction circuit can be connected to the corresponding memory array through a switch, the switch operable to select, based on a signal from the error detection circuit, one of an output from the encoder circuit or an output from the error correction circuit to write to the corresponding memory array. The signal can indicate that the error has been detected. The error correction scheme can include at least one of a single error correction and single error detection (SECSED) scheme or a single error correction and double error detection (SECDED) scheme. The N-bit error processing subsystem is configured to detect an error during a read operation in which N+M bits of data are read from the corresponding memory array.

In general, one aspect of the subject matter described in this specification can be embodied in operations that include: receiving a word to be stored into a memory device; dividing the word into multiple portions; writing a first portion of the word into a first memory array of the memory device using a first error processing subsystem, including adding first parity information to the first portion based on an error detection scheme; in parallel to writing the first portion, writing a second portion into a second memory array of the memory device using a second error processing subsystem, including adding second parity information to the second portion based on the error detection scheme; and designating a combination of the first portion and the second portion as the word stored in the memory device. The first portion and second portion can be equal in length.

In general, one aspect of the subject matter described in this specification can be embodied in operations that include: receiving a request to read, from a memory device, a word having a word length; on a first error processing subsystem, performing operations including: reading a first portion of the word from a first memory array of the memory device, the first memory array coupled to the first error processing subsystem; and performing error detection on the first portion of the word; on a second error processing subsystem, and in parallel to the operations of the first error processing subsystem, performing operations including: reading a second portion of the word from a second memory array of the memory device, the second memory array coupled to the second error processing subsystem; and performing error detection on the second portion of the word; aggregating corrected first portion and corrected second portion into the word; and providing the aggregated word as a response to the request to read the word.

These and other embodiments can optionally include one or more of the following features. Reading a first portion of the word from the first memory array can include reading parity information on the first portion of the word from the first memory array. Performing error correction on the first portion of the word can include: detecting an error in the first portion of the word based at least in part on the parity information; determining that the detected error is correctable; and correcting the error in the first portion of the word. Correcting the error in the first portion of the word can include writing the corrected first portion of the word in the first memory array.

The techniques of parallel memory error detection and correction can be implemented to achieve the following advantages. The techniques described can be used to reduce delay caused by error correction code (ECC) operations in STT-RAM devices (e.g., STT-RAM chips). The techniques described can benefit all memory systems, including SRAM, DRAM, flash memory, MRAM, STT-RAM, resistive random access memory (ReRAM), phase change random access memory (PRAM), and ferroelectric random access memory (FeRAM). A memory device that is generally more prone to errors, or a memory device that requires longer time to write date than to read data (e.g., an MRAM or STT-RAM device) can benefit especially from the described techniques. When an error occurs during a read operation, ECC operations are performed. The ECC operations can include a write operation to correct the stored data that are determined to be erroneous. Accordingly, the read operation can be delayed by the ECC operations including the write operation. On a memory device implementing the techniques described in this specification, an ECC operation on large data (e.g., 128-bit data) is divided into multiple parallel ECC operations on small data (e.g., 8- or 16-bit data). In addition, the write operations can be performed on a portion of the large data (e.g., the 8- or 16-bit data where the error occurred), rather than for the large data in the entirety. ECC operations and write operations on small data are faster than ECC operations and write operations on large data. Thus, comparing to a conventional memory device, and especially a conventional STT-RAM device, the total delay caused by errors is shortened; the read and write performances are improved.

The techniques described can be used to increase the number of errors that can be detected or corrected. When data are processed by multiple error processing subsystems in parallel, the number of errors that can be concurrently corrected can be the number of error processing subsystems times the maximum number of error bits that can be corrected under a given ECC scheme. For example, on a chip that employs a single error correction scheme to correct a 1 (one) bit error, and that includes L error processing subsystems, L errors, rather than a single error, can be corrected in each read operation by the described techniques.

The details of one or more implementations of parallel memory error detection are set forth in the accompanying drawings and the description below. Other features, aspects, and advantages of parallel memory error detection will become apparent from the description, the drawings, and the claims.

BRIEF DESCRIPTION OF THE DRAWINGS

Like reference symbols in the various drawings indicate like elements.

DETAILED DESCRIPTION

Figure 1:
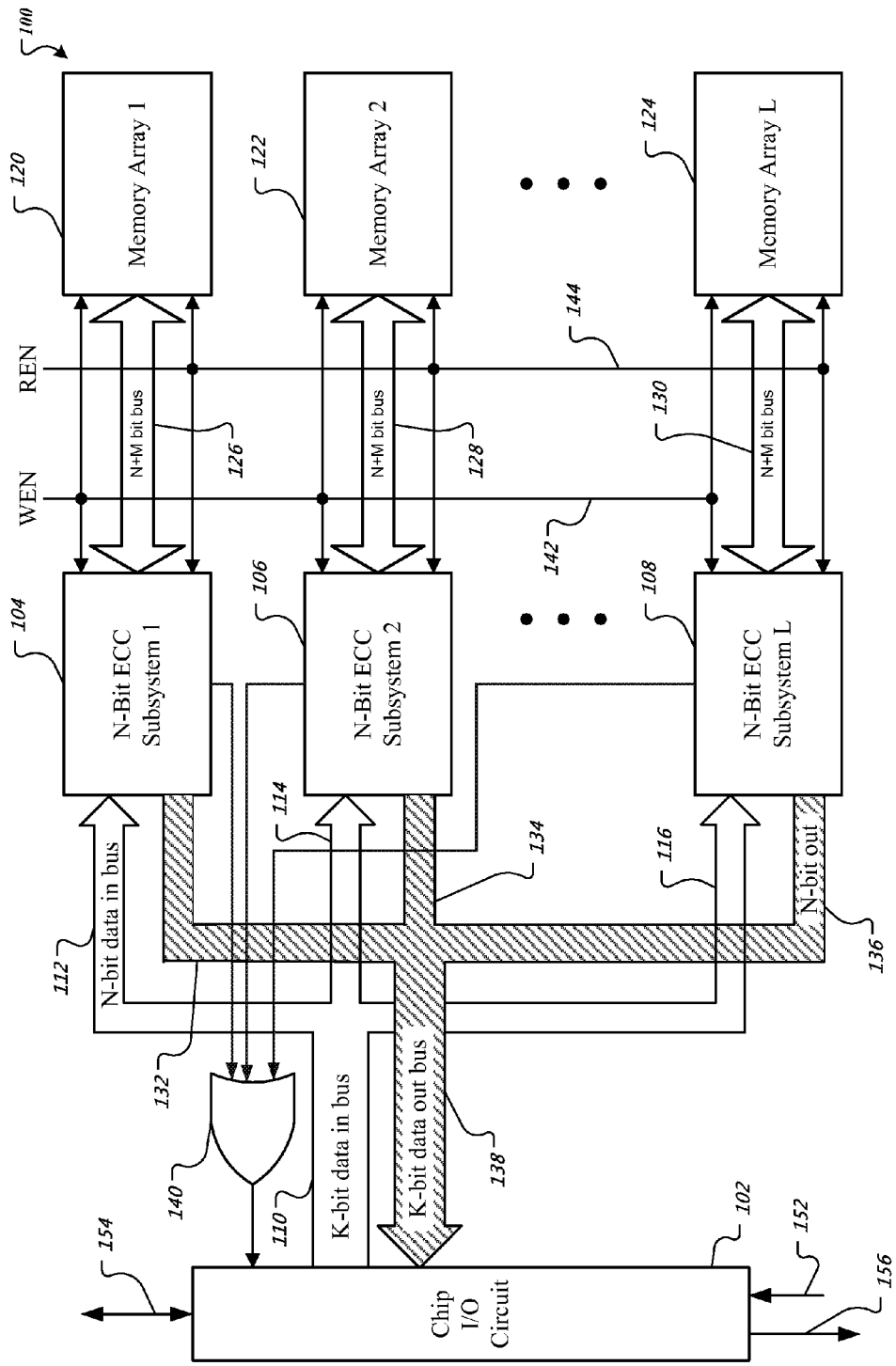
FIG. 1 is a block diagram illustrating an example architecture of an ECC system implementing parallel error detection and correction techniques.

FIG. 1 is a block diagram illustrating an example architecture of an ECC system 100 implementing parallel error detection and correction techniques. The ECC system 100 can be implemented on an apparatus including a memory chip, e.g., an STT-RAM chip. The ECC system 100 is configured to perform error detection and correction on data having a word size of K bits (a K-bit word) using L error processing subsystems (e.g., error processing subsystems 104, 106, and 108). Each of the L error processing subsystems is a component of the ECC system 100 that is configured to perform error detection and correction on an N-bit portion of the K-bit word. The L error processing subsystems are configured to perform error detections and corrections in parallel. L is equal or greater than 2. For example, where K is 48 bits, L can be 3 or 4 or 8, and where K is 128 bits, L can be 4 or 8 or 16, although many other values are possible.

The ECC system 100 receives the K-bit word through input and output (I/O) circuit 102. The I/O circuit 102 is an interface between the ECC system 100 and other data processing or storage systems. The ECC system 100 is configured to encode the data received through the I/O circuit 102 during memory write operations, and to perform error detection and correction based on the encoded data during memory read operations.

In a memory write operation, data received by the ECC system 100 through the I/O circuit 102 are sent to the error processing subsystems 104, 106, and 108 through a K-bit data-in bus 110. The K-bit data-in bus 110 is a data bus having a width of K bits. Each of the error processing subsystems 104, 106, and 108 can be connected to a portion of the K-bit data-in bus 110 through data-in bus 112, 114, or 116, respectively. The error processing subsystems 104, 106, and 108 can be connected to non-overlapping portions of the K-bit data-in bus 110. In some implementations, each of the error processing subsystems 104, 106, and 108 is configured to perform error detection and correction on N bits of data. Accordingly, each of the data-in buses 112, 114, and 116 is an N-bit data-in bus.

For example, when the data received from the I/O circuit 102 is a 128-bit word, each of the error processing subsystems 104, 106, and 108 can be configured to perform error detection and correction on 16 bits of data. Thus, each of the data-in buses 112, 114, and 116 is a 16-bit data-in bus, and a total of eight parallel error processing subsystems are employed (L=8).

In the memory write operation, each of the error processing subsystems 104, 106, and 108 is configured to generate, based on an ECC scheme, M bits of parity information for the respective N bits of data. The parity information includes one or more bits, in accordance to the ECC scheme employed.

In the memory write operation, the resulting N+M bits of data from each of the error processing subsystems 104, 106, and 108 are sent to a corresponding memory array through a data bus. In the ECC system 100, memory arrays 120, 122, and 124 correspond to the error processing subsystems 104, 106, and 108, respectively. Each of the memory arrays 120, 122, and 124 includes multiple memory cells, and is configured to store the N+M bits of data. The N+M bits of data include an N-bit portion of the original K-bit word and the corresponding M bits of parity information. The memory arrays 120, 122, and 124 are connected to the corresponding error processing subsystems 104, 106, and 108 through N+M bit data buses 126, 128, and 130. There are L such N+M bit data buses.

In a memory read operation, in response to a request to read the K-bit word from a memory device, each of the error processing subsystems 104, 106, and 108 reads the N-bit data and the M-bit parity information from a corresponding memory array 120, 122, or 124. The N-bit data and the M-bit parity information are read through an N+M bit data bus 126, 128, or 130, respectively. Each of the error processing subsystems 104, 106, and 108 reads N+M bits of data, and performs error detection on the N bits of data using the M bits of parity information.

If no errors are detected, each of the error processing subsystems 104, 106, and 108 sends its respective N bits of data to the I/O circuit 102. Each of the error processing subsystems 104, 106, and 108 is connected to a respective N-bit data-out bus 132, 134, or 136. The N-bit data-out buses 132, 134, and 136 merge into a K-bit data-out bus 138, which connects to the I/O circuit 102. Thus, the N-bit data from the error processing subsystems 104, 106, and 108 are aggregated into the K-bit word. The aggregated K-bit word is sent to the I/O circuit 102 in response to the request to read the K-bit word.

If, during the memory read operation, the error processing subsystem 104 detects an error in the N bit data, the error processing subsystem 104 attempts to correct the error. If, based on the M-bit parity information in the N+M bits of data read from the memory array 120, the error is a correctable error, the error processing subsystem 104 corrects the N-bit data, and sends the corrected N-bit data through the N-bit data-out bus 132. In addition, the error processing subsystem 104 can regenerate M bits of parity information based on the corrected N bits of data, and write the corrected N bits of data and the regenerated M bits of parity information back to the memory array 120. If, based on the M-bit parity information in the N+M bits of data read from the memory array 120, the error is a correctable error, the error processing subsystem 104 corrects the N-bit data, and sends the corrected N-bit data through the N-bit data-out bus 132. In addition, the error processing subsystem 104 regenerates M bits of parity information based on the corrected N bits of data, and write the corrected N bits of data and the regenerated M bits of parity information back to the memory array 120.

If, based on the M-bit parity information in the N+M bits of data read from the memory array 120, the error processing subsystem 104 determines that the error is an uncorrectable error, the error processing subsystem 104 sends an error flag to error circuit 140. Other error processing subsystems (e.g., the error processing subsystems 106 and 108) can perform error detection and correction in a manner similar to the error detection and correction operations of the error processing subsystem 104, and in parallel with the error detection and correction operations of the error processing subsystem 104. Thus, each of the error processing subsystems 104, 106, and 108 performs error detection and correction operations on a portion of the K bits of data independently. The error circuit 140 can include an OR gate, which receives inputs from the error processing subsystems 104, 106, and 108 and produces an output to the I/O circuit 102. The output includes an error signal indicating an uncorrectable error has been detected. An error flag from any one of the error processing subsystems 104, 106, and 108 triggers the error signal.

Write enable (WEN) circuit 142 and read enable (REN) circuit 144 control the operations of the error processing subsystems 104, 106, and 108 and the corresponding memory arrays 120, 122, and 124. The writing and reading operations of the error processing subsystems 104, 106, and 108 are synchronized, as are the reading and writing operations of the memory arrays 120, 122, and 124. When WEN circuit 142 is in an activated state, e.g., "high", each the error processing subsystems 104, 106, and 108 performs a memory write operation; when REN circuit 144 is in an activated state, e.g., "high", each of the error processing subsystems 104, 106, and 108 performs a memory read operation. It is possible that an error processing subsystem (e.g., error processing subsystem 104) performs a memory write operation independently of other error processing subsystems. The independent write operation can occur when the error processing subsystem 104 detects an error in data, corrects the error in the data, and writes the corrected data into the memory array 120. Further details on the operations of the error processing subsystem 104 will be described below in reference to FIG. 2. Operations of the error processing subsystems 106 and 108 are similar to those of the error processing subsystem 104.

The I/O circuit 102 can be configured to interface between the ECC system 100 and other data processing or storage systems in various ways. For example, the I/O circuit 102 can be configured to receive data through data input circuit 152 or bidirectional circuit 154, or to send data to bidirectional circuit 154 or data output circuit 156. Each of the circuits 152, 154, and 156 can have a width W that is greater than or equal to N and less than or equal to K.

Figure 2:
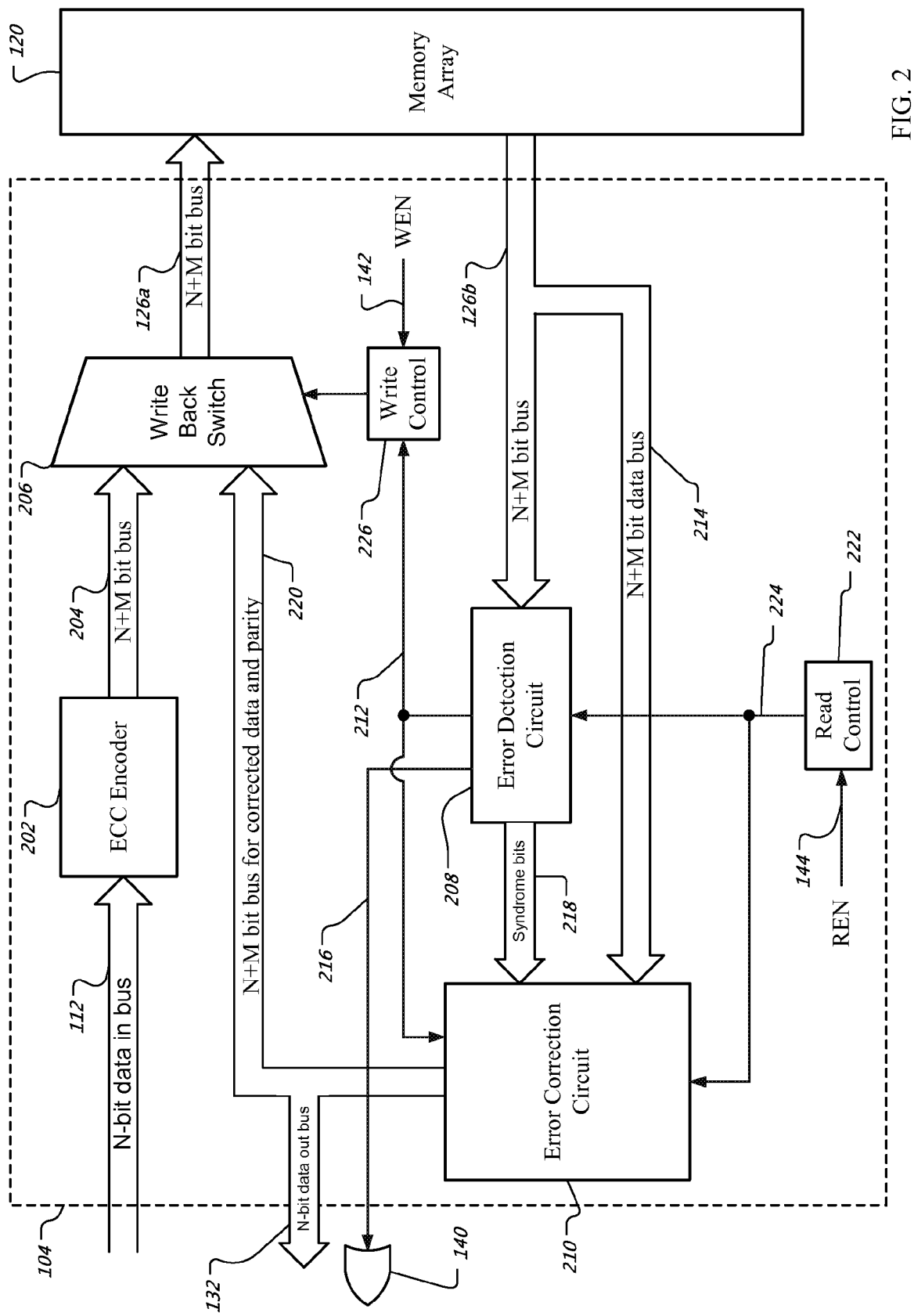
FIG. 2 is a block diagram illustrating an example error processing subsystem of the ECC system of FIG. 1.

FIG. 2 is a block diagram illustrating the example error processing subsystem 104 of the ECC system of FIG. 1. The error processing subsystem 104 is an N-bit error processing subsystem that performs error detection and correction on an N-bit portion of the K-bit word (as described in reference to FIG. 1) during memory write and read operations.

During memory write operations, the error processing subsystem 104 receives N bits of the K-bit word through N-bit data-in bus 112. The N-bit data-in bus 112 is connected to an ECC encoder circuit 202 of the error processing subsystem 104. The ECC encoder circuit 202 is a component of the error processing subsystem 104 that generates parity information, including error detection and error correction information, for the N-bit data. The ECC encoder circuit 202 generates M bits of parity information based on the N-bit data. The value of M can be determined by N (the number of input data bits), and an ECC scheme employed in the error processing subsystem 104. For example, when N=4, and a single error correction and single error detection (SECSED) scheme is employed, the value of M can be three. If N=4, and a single error correction and double error detection (SECDED) scheme is employed, the value of M can be four. An example error detection and correction scheme is Hamming Code. In some implementations, multiple error processing subsystems can employ a same error detection and correction scheme. In some other implementations, two error processing subsystems can employ two error detection and correction schemes that are different from one another.

During the memory write operations, the ECC encoder circuit 202 generates an output that includes N+M bits of data. The output is written to the memory array 120 through an N+M bit data bus 204, a write back switch 206, and an N+M bit data bus 126a. The N+M bit data bus 204 connects the ECC encoder circuit 202 to the write back switch 206. The output from the ECC encoder circuit 202 is designated as an input to the write back switch 206. The write back switch 206 produces an N+M bit output. The N+M bit output of the write back switch 206 is written to the memory array 120 in a write cycle through an N+M bit data bus 126a that connects the write back switch 206 with the memory array 120. More detailed descriptions of operations of the write back switch 206 will be described later.

During memory read operations, the error processing subsystem 104 reads N+M bits of data through N+M bit data bus 126b. N+M bit data bus 126a and N+M bit data bus 126b correspond to the N+M bit data bus 126 of FIG. 1. The error processing subsystem 104 includes an error detection circuit 208. The error detection circuit 208 is a component of the error processing subsystem 104 that is configured to detect one or more errors in the N+M bit data read from the memory array 120. Detecting an error in the N+M bit data read from memory array 120 includes identifying the N-bit data portion of the N+M bit data and the M-bit parity information of the N+M bit data. The error detection circuit 208 then employs the error detection scheme and uses the M-bit parity information to determine whether an error exists in the N+M bit data.

If no error is detected, the error detection circuit 208 sends a first error code (e.g., "0") to an error correction circuit 210 through connection 212. The first error code is a code that indicates no error has been detected. The error correction circuit 210 is a component of the error processing subsystem 104 that is configured to correct an error if the error exists, or providing unaltered N-bit data as an output. The error correction circuit 210 is connected to a portion of the N+M bit data bus 126b through an N+M bit data bus 214. Upon receiving the first error code, the error correction circuit 210 provides the N-Bit data for output through an N-bit data-out bus 132.

If an error is detected, the error detection circuit 208 determines, based on the N-bit data, M-bit parity information, and the error detection scheme, whether the detected error is correctable. If the error detection circuit 208 determines that the error is uncorrectable, the error detection circuit 208 sends an error flag ERR to error circuit 140 through connection 216. The error circuit 140 can send the error flag to an error flag output buffer in the I/O circuit 102 as described in reference to FIG. 1.

If an error is detected, and the error detection circuit 208 determines that the error is correctable, the error detection circuit 208 sends a second error code (e.g., "1") to the error correction circuit 210 through connection 212. Additionally, the error detection circuit 208 sends one or more syndrome bits to error correction circuit 210 through connection 218. The second error code is a code that indicates that at least one correctable error has been detected. The syndrome bits indicate if there are errors in the N+M bit data. If syndrome bits are zero during the error detection processing, there is no error in the data. Otherwise, there is at least one error in the data. The syndrome bits can further indicate whether an error is a correctable error or an uncorrectable error. The value for indicating whether an error is correctable is determined based on the error correction scheme employed. When a correctable error is detected, the syndrome bits from the error detection circuit 208 are used, by the error correction circuit 210, to identify which data bit is erroneous and is to be corrected. The width of the syndrome code can be the same as parity. Based on the syndrome bits, the second error code, and an error correction scheme, the error correction circuit 210 corrects the error in the N-bit data. In some implementations, the error correction circuit 210 regenerates M-bit parity information for the corrected N-bit data. Output from the error correction circuit 210, including N+M bits of corrected data and parity information, are sent to write back switch 206 for writing back to the memory array 120.

The read and write operations of the error processing subsystem 104 are generally controlled by the WEN circuit 142 and the REN circuit 144. For example, a read control circuit 222 is configured to detect a state of the REN circuit 144 and, upon detecting that the REN circuit 144 is in an activated state, e.g., "high," initiate the operations of the error detection circuit 208 and the error correction circuit 210 through connection 224. A write control circuit 226 is configured to detect a state of the WEN circuit 142, and upon detecting that WEN circuit 142 is in an activated state, e.g., "high", instruct the write back switch 206 to write the N+M bit data received from ECC encoder circuit 202 through the N+M bit data bus 204 to the memory array 120. Additionally, the write control circuit 226 is configured to receive the second error code from the error detection circuit 208, the second error code indicating that at least one correctable error has been detected. The write control circuit 226 controls which input to the write back switch 206 is written into the memory array 120. Upon receiving the second error code, the write control circuit 226 instructs the write back switch 206 to write the corrected N+M bit data received from error correction circuit 210 through the N+M bit data bus 220 to the memory array 120. The corrected N+M bit data replaces the erroneous N+M bit data in the memory array 120.

An ECC system on a chip can include L error processing subsystems and L memory arrays, each of the L error processing subsystems being an error processing subsystem 104 described above in reference to FIG. 1 and FIG. 2. When there are K bits of data, the relations between the K bits of data and the L error processing subsystems and L memory arrays can be expressed using the following formula:

$$K = L*N,$$

where N is the number of bits of each error processing subsystem.

When WEN circuit 142 is in an activated (e.g., "1") state, memory write operations are performed on all memory arrays. When REN circuit 144 is in an activated state, memory read operations are performed on all memory arrays. During the memory read operations, if there are correctable errors in any of the memory arrays, a corresponding error processing subsystem corrects the error and writes the corrected data back to the memory array. The total number of errors can be corrected in the ECC system on a chip ("Etotal") can be expressed using the following formula:

$$Etotal = L*Emax,$$

where Emax is the number of correctable errors in each error processing subsystem according to a specified error correction scheme.

For example, when a single error correction scheme is employed in each error processing subsystem, Emax has the value of one. Thus, the total number of errors that can be corrected is L*1=L. By comparison, in a conventional error correction system employing a single error correction scheme, the total number of errors that can be corrected is one.

A number of implementations of parallel error detection and correction techniques have been described. Nevertheless, it will be understood that various modifications can be made without departing from the spirit and scope of the invention.

What is claimed is:

1. An apparatus, comprising:
a first N-bit error processing subsystem coupled to a first memory array, the first error processing subsystem configured to perform first error processing on a first portion of a K-bit word carried on a K-bit data bus, the first portion of the K-bit word stored in the first memory array;
a second N-bit error processing subsystem coupled to a second memory array, the second N-bit error processing subsystem configured to perform, in parallel to the first error processing of the first N-bit error processing subsystem, second error processing on a second portion of the K-bit word, the second portion of the K-bit word stored in the second memory array;
an error circuit being connected to the first N-bit error processing subsystem and the second N-bit error processing subsystem, the error circuit configured to produce an error signal when either the first N-bit error processing subsystem or the second N-bit error processing subsystem detects an error, the error signal indicating that a memory error has occurred to the K-bit word; and
a first N+M bit bus coupled to the first memory array and to the first N-bit error processing subsystem,
wherein the first memory array and the second memory array are portions of a spin-transfer torque random access memory (STT-RAM) device,
wherein at least one of the first or second N-bit error processing subsystem is configured to add M bits of parity information to N bits of the K-bit word using a specified error correction scheme and store resulting N+M bits of data in a corresponding memory array during a memory write operation, and wherein the first N-bit error processing subsystem comprises:
an encoder circuit connected to a K-bit data bus, the encoder circuit being configured to receive N bits of the K-bit word and generate the M bits of parity information for the N bits of the K-bit word;
an error detection circuit connected to the first memory array, the error detection circuit configured to detect an error in the N bits of the K-bit word based at least in part on the M bits of parity information and the error correction scheme and generate one or more syndrome bits indicating the detected error;
an error correction circuit connected to the error detection circuit, the error correction circuit configured to correct the detected error using the one or more syndrome bits; and
a write back switch coupled to the first N+M bit bus that is coupled to the first memory array, wherein a first input of the write back switch is coupled to a first internal N+M bit bus that is coupled to an output of the encoder circuit, and wherein a second input of the write back switch is coupled to a second internal N+M bit bus that is coupled to an output of the error correction circuit, wherein:
the encoder circuit and the error correction circuit are connected to the first memory array through the write back switch, the write back switch operable to select, based on a signal from the error detection circuit, one of an output from the encoder circuit or an output from the error correction circuit to write to the first memory array, wherein the signal indicates that the error has been detected.

2. The apparatus of claim 1, wherein:
each of the first N-bit error processing subsystem and second N-bit error processing subsystem includes an error detection circuit and an error correction circuit; and
each of the first error processing and second error processing includes at least one of error detection or error correction.

3. The apparatus of claim 1, wherein:
the second N-bit error processing subsystem is configured to perform the second error processing independently from the first error processing performed by the first N-bit error processing subsystem.

4. The apparatus of claim 1, wherein at least one of the first or second N-bit error processing subsystem is configured to detect a correctable error and an uncorrectable error.

5. The apparatus of claim 4, wherein the N-bit error processing subsystem is configured to, upon detecting the correctable error, correct the correctable error, including writing corrected data to a memory array corresponding to the N-bit error processing subsystem.

6. The apparatus of claim 4, wherein the N-bit error processing subsystem is configured to, upon detecting the uncorrectable error, send an error flag to the error circuit.

7. The apparatus of claim 6, wherein the error circuit is configured to produce the error signal upon receiving an error flag from the first N-bit error processing subsystem or the second N-bit error processing subsystem or both.

8. The apparatus of claim 1, wherein the error correction scheme includes at least one of a single error correction and single error detection (SECSED) scheme or a single error correction and double error detection (SECDED) scheme.

9. The apparatus of claim 1, wherein the N-bit error processing subsystem is configured to detect an error during a read operation in which N+M bits of data are read from the corresponding memory array.

10. A method, comprising:
receiving a K-bit word to be stored into a memory device;
dividing the K-bit word into multiple portions;
receiving, by a first encoder circuit connected to a K-bit data bus, N bits of the K-bit word;
generating, by the first encoder circuit, M bits of parity information for the N bits of the K-bit word;
writing a first portion of the K-bit word having the N bits into a first memory array of the memory device using a first error processing subsystem, including adding first parity information having the M bits of parity information to the first portion based on an error detection scheme;
in parallel to writing the first portion, writing a second portion having the N-bits into a second memory array of the memory device using a second error processing subsystem, including adding second parity information having the M bits of parity information to the second portion based on the error detection scheme;
designating a combination of the first portion and the second portion as the K-bit word stored in the memory device,
detecting, by a first error detection circuit, a first error in the first portion of the K-bit word having the N bits, based at least in part on the M bits of parity information;
generating, by the first error detection circuit, a signal indicating that the first error has been detected;
generating, by the first error detection circuit, one or more first syndrome bits indicating the detected first error;
correcting, by a first error correction circuit, the detected first error using the one or more first syndrome bits;
selecting, by a first write back switch, based on the signal indicating that the first error has been detected, one of an output from the first encoder circuit or an output from the first error correction circuit;
writing, by the first write back switch, the one of the output from the first encoder circuit or the output from the first error correction circuit to the first memory array;
detecting, by a second error detection circuit, a second error in the second portion of the K-bit word having the N bits, based at least in part on the M bits of parity information;
generating, by the second error detection circuit, a signal indicating that the second error has been detected;
generating, by the second error detection circuit, one or more second syndrome bits indicating the detected second error;
correcting, by a second error correction circuit, the detected second error using the one or more second syndrome bits;
selecting, by a second write back switch, based on the signal indicating that the second error has been detected, one of an output from a second encoder circuit or an output from the second error correction circuit; and
writing, by the second write back switch, the one of the output from the second encoder circuit or the output from the second error correction circuit to the second memory array, in parallel with the first write back switch writing to the first memory array,
wherein the first memory array and the second memory array are portions of a spin-transfer torque random access memory (STT-RAM) device.

11. The method of claim 10, wherein the first portion and second portion are equal in length.

12. A method, comprising:
receiving a request to read, from a memory device, a word having a word length;
on a first error processing subsystem, performing operations comprising:
reading a first portion of the word from a first memory array of the memory device, the first memory array coupled to the first error processing subsystem; and
performing error correction on the first portion of the word;
on a second error processing subsystem, and in parallel to the operations of the first error processing subsystem, performing operations comprising:
reading a second portion of the word from a second memory array of the memory device, the second memory array coupled to the second error processing subsystem; and
performing error correction on the second portion of the word;
aggregating the corrected first portion and the corrected second portion into the word; and
providing the aggregated word as a response to the request to read the word,
wherein the first memory array and the second memory array are portions of a spin-transfer torque random access memory (STT-RAM) device,
wherein reading a first portion of the word from the first memory array includes reading parity information on the first portion of the word from the first memory array,
wherein performing error correction on the first portion of the word includes:
detecting, by a first error detection circuit, an error in the first portion of the word based at least in part on the parity information;
generating, by the first error detection circuit, a signal indicating that the error in the first portion of the word has been detected;
generating, by the first error detection circuit, one or more first syndrome bits indicating the detected error in the first portion of the word;
correcting, by a first error correction circuit, the error in the first portion of the word using the one or more first syndrome bits,
selecting, by a first write back switch, based on the signal indicating that the error in the first portion of the word has been detected, one of an output from a first encoder circuit or an output from the first error correction circuit; and
writing, by the first write back switch, the one of the output from the first encoder circuit or the output from the first error correction circuit to the first memory array;
wherein performing error correction on the second portion of the word includes:
detecting, by a second error detection circuit, an error in the second portion of the word based at least in part on the parity information;
generating, by the second error detection circuit, a signal indicating that the error in the second portion of the word has been detected;
generating, by the second error detection circuit, one or more second syndrome bits indicating the detected error in the second portion of the word;
correcting, by a second error correction circuit, the error in the second portion of the word using the one or more second syndrome bits, selecting, by a second write back switch, based on the signal indicating that the error in the second portion of the word has been detected, one of an output from a second encoder circuit or an output from the second error correction circuit; and writing, by the second write back switch, the one of the output from the second encoder circuit or the output from the second error correction circuit to the second memory array, in parallel with the first write back switch writing to the first memory array.

13. The apparatus of claim 1, wherein:

the write back switch is configured to select, based on the signal from the error detection circuit, the output from the error correction circuit; and the write back switch is configured to write the output from the error correction circuit to the first memory array.

14. The apparatus of claim 1, further comprising:

a second N+M bit bus coupled to the second memory array and to the second N-bit error processing subsystem, wherein the write back switch is referred to as a first write back switch, the encoder circuit is referred to as a first encoder circuit, the error detection circuit is referred to as a first error detection circuit, the error correction circuit is referred to as a first error correction circuit, the N bits of the K-bit word are referred to as first N bits of the K-bit word, the one or more syndrome bits are referred to as one or more first syndrome bits, and wherein the second N-bit error processing subsystem comprises:

a second encoder circuit connected to the K-bit data bus, the second encoder circuit being configured to receive second N bits of the K-bit word and generate the M bits of parity information for the second N bits of the K-bit word;

a second error detection circuit connected to the second memory array, the second error detection circuit configured to detect an error in the second N bits of the K-bit word based at least in part on the M bits of parity information and the error correction scheme and generate one or more second syndrome bits indicating the detected error;

a second error correction circuit connected to the second error detection circuit, the second error correction circuit configured to correct the detected error using the one or more second syndrome bits; and a second write back switch coupled to the second N+M bit bus that is coupled to the second memory array, wherein a first input of the second write back switch is coupled to a third internal N+M bit bus that is coupled to an output of the second encoder circuit, and wherein a second input of the second write back switch is coupled to a fourth internal N+M bit bus that is coupled to an output of the second error correction circuit, wherein:

the second encoder circuit and the second error correction circuit are connected to the second memory array through the second write back switch, the second write back switch operable to select, based on a signal from the second error detection circuit, one of an output from the second encoder circuit or an output from the second error correction circuit to write to the second memory array, in parallel with the first write back switch writing to the first memory array, wherein the signal indicates that the error has been detected.

* * * * *